(12) United States Patent
Timonen et al.

(10) Patent No.: US 12,468,197 B1
(45) Date of Patent: Nov. 11, 2025

(54) USING ELECTRICALLY-CONDUCTIVE ADHESIVE MATERIAL FOR PROVIDING CONNECTIONS TO ELECTRODES

(71) Applicant: Pixieray Oy, Espoo (FI)

(72) Inventors: Juha Timonen, Kauniainen (FI); Klaus Melakari, Espoo (FI)

(73) Assignee: Pixieray Oy, Espoo (FI)

( * ) Notice: Subject to any disclaimer, the term of this patent is extended or adjusted under 35 U.S.C. 154(b) by 0 days.

(21) Appl. No.: 18/658,125

(22) Filed: May 8, 2024

Related U.S. Application Data

(63) Continuation-in-part of application No. 18/327,164, filed on Jun. 1, 2023, now Pat. No. 12,265,305.

(51) Int. Cl.
*G02F 1/1343* (2006.01)
*G02F 1/1333* (2006.01)
*G02F 1/1345* (2006.01)

(52) U.S. Cl.
CPC .... *G02F 1/13439* (2013.01); *G02F 1/133354* (2021.01); *G02F 1/13452* (2013.01)

(58) Field of Classification Search
CPC ........... G02F 1/13452; G02F 1/133354; G02F 1/133351; G02F 1/134309; G02F 1/1347; G02F 2202/28; G02F 1/13454; G02F 1/13456; G02F 1/13458; G02F 1/133365; G02F 1/0311; G02F 1/0316; B23K 26/362; B23K 26/364; B23K 26/38; B23K 26/382; B23K 28/00
See application file for complete search history.

(56) References Cited

U.S. PATENT DOCUMENTS

| | | | | |
|---|---|---|---|---|
| 2002/0033911 A1* | 3/2002 | Ishida | ................... | G02F 1/1347 349/143 |
| 2007/0183293 A1* | 8/2007 | Murata | .............. | G11B 7/13925 369/112.02 |
| 2014/0085579 A1* | 3/2014 | Fan | ........................ | G02F 1/1337 349/122 |
| 2019/0243199 A1* | 8/2019 | Bae | ...................... | G02F 1/13458 |
| 2020/0004093 A1* | 1/2020 | Yoo | ......................... | H01L 24/03 |
| 2020/0264468 A1* | 8/2020 | Park | ...................... | G02F 1/13452 |
| 2022/0050318 A1* | 2/2022 | Lin | ........................ | G02F 1/1337 |
| 2024/0402546 A1* | 12/2024 | Melakari | ............. | G02F 1/13452 |

FOREIGN PATENT DOCUMENTS

| | | | | |
|---|---|---|---|---|
| JP | 01101517 A | * | 4/1989 | ........... G02F 1/1345 |
| JP | 2000214424 A | * | 8/2000 | |
| JP | 2005072098 A | * | 3/2005 | ............. H01L 24/36 |
| KR | 102459719 B1 | * | 10/2022 | |

* cited by examiner

*Primary Examiner* — Phu Vu
(74) *Attorney, Agent, or Firm* — ZIEGLER IP LAW GROUP, LLC.

(57) ABSTRACT

Disclosed is a method for manufacturing an optical device. An electrically-conductive adhesive material is deposited on a first part of a first electrode deposited on a first substrate. A layer of at least one active material is formed between the first substrate and a second substrate, wherein the first electrode is disposed between the first substrate and said layer, and a second electrode is disposed between the second substrate and said layer. The optical device is cut through the first part of the first electrode, thereby exposing the ECA material deposited on the first part of the first electrode. A driving circuit of the optical device is electrically connected with the ECA material deposited on the first part of the first electrode, to provide an electrical connection between the driving circuit and the first electrode.

15 Claims, 3 Drawing Sheets

USING ELECTRICALLY-CONDUCTIVE ADHESIVE MATERIAL FOR PROVIDING CONNECTIONS TO ELECTRODES

TECHNICAL FIELD

The present disclosure relates to methods for manufacturing optical devices. The present disclosure also relates to methods for assembling a plurality of optical devices.

BACKGROUND

In the context of Liquid Crystal (LC)-based optical devices, electrodes play a crucial role in controlling an orientation of liquid crystal molecules within such LC-based optical devices. As an example, an LC-based optical device utilizes a liquid crystal material to manipulate a polarization of light passing therethrough, thereby controlling a direction and focus of the light. Electrodes are typically placed on a surface of a substrate of the optical device. These electrodes generate an electric field across an LC layer when a voltage is applied to them. By varying the voltage across different electrodes, it is possible to control the orientation of the liquid crystal molecules in different regions of the LC layer. The orientation of these LC molecules affects how they interact with polarized light passing through the optical device, allowing the optical device to change its optical properties, such as focus or directionality. By selectively applying voltage to different electrodes, the properties of the LC layer can be adjusted, enabling the optical device to dynamically change its optical properties. This ability is fundamental to the functioning of optical device in applications, such as adaptive optics, autofocus systems, and 3D displays.

Typically, electrode stacking in optical devices involves a strategic arrangement of multiple electrode layers within these optical devices to facilitate precise control over the orientation of liquid crystal molecules.

This control is essential for achieving desired optical properties, such as polarization modulation, focus, or directionality.

The process typically starts with depositing a transparent conductive material (for example, such as indium tin oxide (ITO) or similar) onto a first substrate, which could be made of glass or a transparent polymer. This forms a first electrode. The first electrode provides a conductive surface for applying an electric field across the LC layer. Above the first electrode, an alignment layer is often deposited. The alignment layer guides the orientation of the liquid crystal molecules, ensuring they align uniformly when subjected to an electric field. This layer is crucial for achieving consistent optical performance.

The LC material is then applied onto the alignment layer. The LC molecules have an inherent orientation that can be influenced by an electric field. Depending on the type of LC material used and the specific application requirements, different liquid crystal formulations may be employed. On top of a second substrate, a second transparent conductive layer is deposited to form a second electrode. Similar to the first electrode, the second electrode allows the application of an electric field across the liquid crystal layer. By applying voltage between the first electrode and the second electrode, the orientation of the LC molecules can be controlled, thereby modulating the polarization of light passing through the optical device.

In current practices, to connect the electrodes to a driving circuit of the optical device, the transparent conductive material (for example, such as ITO) is connected in-plane using an anisotropic conductive film (ACF) to bond a surface of the first electrode to a flexible printed circuit board (FPCB). However, multiple layers of optical devices typically need to be in stack, to be able to work with non-polarised light and/or to reach a sufficiently high optical power for various practical applications.

Connecting such a stack of the optical devices is very difficult and yields a clumsy integration.

Therefore, in light of the foregoing discussion, there exists a need to overcome the aforementioned drawbacks associated with the existing techniques and equipment for providing connections to electrodes of an optical device.

SUMMARY

The present disclosure seeks to provide a method for providing electrode connections when manufacturing optical devices. The aim of the present disclosure is achieved by a manufacturing method that involves depositing an electrically-conductive adhesive material on a part of a given electrode of an optical device, cutting the optical device through said part of the given electrode, and electrically connecting a driving circuit of the optical device with the electrically-conductive adhesive material deposited on said part of the given electrode, to provide an electrical connection between the driving circuit and the given electrode, as defined in appended independent claims to which reference is made to. Advantageous features are set out in the appended dependent claims.

Embodiments of the present disclosure substantially eliminate or at least partially address the aforementioned problems in the prior art, and enable manufacturing of optical devices in an efficient, simple and a reliable manner, thereby facilitating continuous and reliable electrical connectivity between a given electrode and a driving circuit.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 2A illustrates a front cross-section view of an optical device, whereas

DETAILED DESCRIPTION OF EMBODIMENTS

Figure 1:
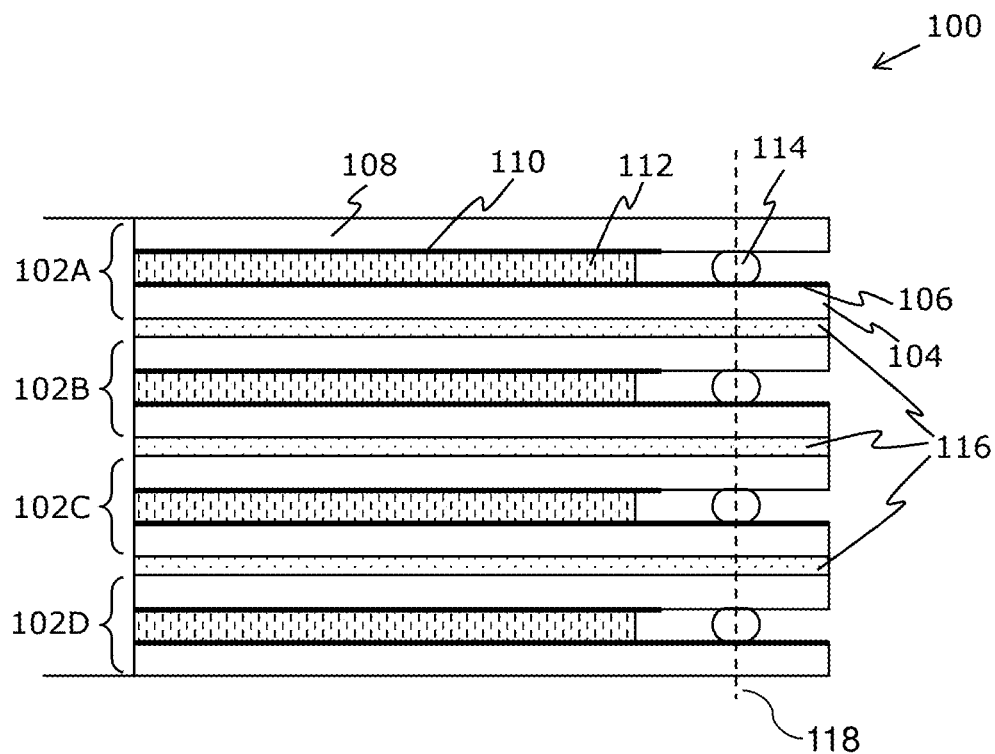
FIG. 1 illustrates a cross-section view of an assembly of a plurality of optical devices, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a method for manufacturing an optical device, the method comprising:
- depositing an electrically-conductive adhesive material on a first part of a first electrode, the first electrode being deposited on a first substrate of the optical device;
- forming a layer of at least one active material between the first substrate and a second substrate of the optical device, wherein the first electrode is disposed between the first substrate and said layer of the at least one active material, and a second electrode is disposed between the second substrate and said layer of the at least one active material, the second electrode being deposited on the second substrate;
- cutting the optical device through the first part of the first electrode, thereby exposing the electrically-conductive adhesive material deposited on the first part of the first electrode; and
- electrically connecting a driving circuit of the optical device with the electrically-conductive adhesive material deposited on the first part of the first electrode, to provide an electrical connection between the driving circuit and the first electrode.

In a second aspect, an embodiment of the present disclosure provides a method for assembling a plurality of optical devices, the method comprising:
- manufacturing a plurality of optical devices, wherein each of the plurality of optical devices is manufactured using the aforementioned method for manufacturing according to the first aspect of the present disclosure;
- stacking the plurality of optical devices together, whilst aligning respective first parts of first electrodes of the plurality of optical devices together;
- cutting the plurality of optical devices through the respective first parts of the first electrodes of the plurality of optical devices; and
- electrically connecting a driving circuit with an electrically-conductive adhesive material deposited on the respective first parts, to provide an electrical connection between the driving circuit and respective first electrodes.

The present disclosure provides the aforementioned method for manufacturing an optical device and the aforementioned method for assembling a plurality of optical devices. Pursuant to embodiments of the present disclosure, the electrically-conductive adhesive material is deposited on a given part of the first electrode and the optical device is cut through this given part of the first electrode, thereby exposing the electrically-conductive adhesive material. This provides a plenty of surface area for electrically connecting the (exposed) electrically-conductive adhesive material (deposited on the first part of the first electrode) and the driving circuit. This facilitates a continuous and reliable electrical connectivity between the first electrode and the driving circuit. Thus, the aforementioned manufacturing method is simple, yet efficient and reliable. While providing the technical benefits mentioned hereinabove, the said method allows the optical device to remain in a laminated stack panel form while the optical device is cut to a desired shape as per need. This allows for leveraging this manufacturing method to assemble a plurality of optical devices, wherein the plurality of optical devices can be cut through their respective first parts of the first electrodes of the plurality of optical devices (on which the electrically-conductive adhesive material was deposited) in a single step, thereby allowing for making the electrical connections between these first electrodes and the driving circuit.

When the electrically-conductive adhesive material deposited on the first electrode is electrically connected with the driving circuit of the optical device, a conductive pathway is created between the first electrode and the driving circuit, thereby allowing a flow of electrical signals (i.e., voltage or current) between them. Hence, the driving circuit is able to control the operation of the optical device by sending electrical signals through the conductive pathway to the first electrode.

Similarly, optionally, the method further comprises:
- depositing the electrically-conductive adhesive material on a second part of the second electrode also;
- aligning the first substrate and the second substrate together, prior to or during the step of forming the layer of the at least one active material, wherein the first part of the first electrode does not overlap with the second part of the second electrode when the first substrate and the second substrate are aligned together;
- cutting the optical device through the second part of the second electrode also, thereby exposing the electrically-conductive adhesive material deposited on the second part of the second electrode; and
- electrically connecting the driving circuit of the optical device with the electrically-conductive adhesive material deposited on the second part of the second electrode, to provide an electrical connection between the driving circuit and the second electrode.

A technical benefit of depositing the electrically-conductive adhesive material on the second part of the second electrode also, and cutting the optical device through the second part of the second electrode also is that it provides a plenty of surface area for electrically connecting the (exposed) electrically-conductive adhesive material deposited on the second part of the second electrode and the driving circuit. This facilitates a continuous and reliable electrical connectivity between the second electrode and the driving circuit as well. Thus, the same manufacturing method can be employed to provide the electrical connection between the second electrode and the driving circuit, in a simple, yet efficient and reliable manner.

When the electrically-conductive adhesive material deposited on the second electrode is electrically connected with the driving circuit of the optical device, a conductive pathway is created between the second electrode and the driving circuit, thereby allowing a flow of electrical signals (i.e., voltage or current) between them. Hence, the driving circuit is able to control the operation of the optical device by sending signals through the conductive pathways to the second electrode.

Accordingly, optionally, in the method for assembling the plurality of optical devices, the electrically-conductive adhesive material is also deposited on respective second parts of second electrodes of the plurality of optical devices,
- wherein the respective second parts are also aligned together during stacking,
- wherein the plurality of optical devices are also cut through the respective second parts of the second electrodes during the step of cutting,
- the method further comprising electrically connecting the driving circuit with the electrically-conductive adhesive material deposited on the respective second parts, to provide an electrical connection between the driving circuit and respective second electrodes.

Cutting the plurality of optical devices also through the respective second parts of the second electrodes exposes the electrically-conductive adhesive material. When the electrically-conductive adhesive material in the remaining portion of the respective second parts is electrically connected with the driving circuit of the optical device, a conductive pathway is created between the respective second electrodes and the driving circuit, thereby allowing a flow of electrical signals (i.e., voltage or current) between them. Hence, the driving circuit is able to control the operation of the plurality of optical devices by sending signals through the conductive pathways to the second electrodes of the plurality of optical devices. As mentioned earlier, while providing the technical benefits mentioned hereinabove, the said method of assembling allows the plurality of optical devices to remain in a stack while the plurality of optical devices are cut in the single step.

Pursuant to embodiments of the present disclosure, the electrically-conductive adhesive material can be deposited by using any one of: dispensing, stencil printing. Dispensing and stencil printing techniques are well known in the art. Optionally, the electrically-conductive adhesive material is deposited in a form of at least one of: one or more dots, one or more lines. Such dots and lines can be deposited using a dispenser (for example, such as a dispensing tube or similar). Moreover, the one or more lines can be easily deposited using a stencil printing technique.

In some implementations, a width of the electrically-conductive adhesive material deposited on the first part and optionally the second part is same as a width of a gap between the first substrate and the second substrate in the optical device. This is possible to achieve by depositing a precise amount of the electrically-conductive adhesive material on the first part and optionally the second part. This can be done by controlling settings of a dispensing technique or a stencil printing technique that is used for depositing the electrically-conductive adhesive material. Advantageously, this facilitates a stable deposition of the electrically-conductive adhesive material on the first part and optionally the second part. As a result, when the optical device is cut through the first part and optionally the second part, the electrically-conductive adhesive material does not flow out of the cut area.

Throughout the present disclosure, the term "optical device" refers to a device that creates electromagnetic radiation or a device that manipulates electromagnetic radiation. The phrase "creates electromagnetic radiation" refers to a process of generating electromagnetic radiation. Examples of such an optical device that creates electromagnetic radiation include, but are not limited to, a liquid crystal display panel, a liquid crystal on silicon (LCOS) display panel, an organic light-emitting diode display panel, an electrophoretic display panel. The phrase "manipulates electromagnetic radiation" refers to controlling of properties of the electromagnetic radiation. Herein, the properties of the electromagnetic radiation may include at least one of: a wavelength, a frequency, an amplitude, a polarization, a direction of propagation. The optical device can manipulate electromagnetic radiation by at least one of: refracting, reflecting, absorbing, transmitting, interfering, the electromagnetic radiation. Examples of such an optical device that manipulates electromagnetic radiation include, but are not limited to, a liquid crystal lens, an electro-wetting lens, an index-matching lens, a tunable optical filter. Such an optical device may, for example, be utilised in various optical apparatuses, for example, such as adaptive eyeglasses.

Moreover, optionally, the method further comprises:
forming a first layer of a first electrode material on a surface of the first substrate;
ablating the first layer of the first electrode material to create the first electrode;
forming a second layer of a second electrode material on a surface of the second substrate; and
ablating the second layer of the second electrode material to create the second electrode.

This allows for creating the first electrode and the second electrode of the optical device. These steps are performed prior to depositing the electrically-conductive adhesive material on the first part and optionally the second part. Throughout the present disclosure, the term "electrode material" refers to a substance that is used to make an electrode. A given electrode material (namely, the first electrode material and/or the second electrode material) can be optically transparent or optically opaque, depending on a specific application of the optical device. The optical transparency of the given electrode material enables passage of light therethrough, while the optical opaqueness of the given electrode material enables absorption, scatter, or reflection of light. Examples of an optically transparent electrode material may include, but are not limited to, indium tin oxide (ITO), doped zinc oxide (ZnO; ZnO being doped with aluminium or hydrogen), a conductive polymer, and graphene. Examples of an optically opaque electrode material include, but are not limited, metals (for example, such as copper, aluminium, gold, platinum, nickel or similar) and metal alloys.

Throughout the present disclosure, the term "substrate" refers to a base upon which a given layer of a given electrode material is deposited. The given substrate also provides support to the given layer of the given electrode material. Herein, the given substrate encompasses the first substrate and the second substrate. Likewise, the given layer encompasses the first layer and the second layer. Similarly, the given electrode material encompasses the first electrode material and the second electrode material. Moreover, the given substrate can be made of any one of: a glass, a plastic, a polycarbonate, a high-index plastic, a flexible membrane.

The first layer of the first electrode material and the second layer of the second electrode material can be formed using deposition techniques that are well-known in the art. Examples of such deposition techniques may include, but are not limited to, a sputtering technique, an evaporation technique, and a chemical vapor deposition technique. Herein, the first layer and/or the second layer can be formed as a thin layer. A technical effect of forming the thin layer is that conductivity of the given electrode material is improved as electrical resistance reduces. Furthermore, an amount of light reflected from the given electrode material is reduced to improve a contrast and readability when the optical device is implemented for display purposes. It will be appreciated that the second electrode material may be same as or different from the first electrode material.

Throughout the present disclosure, the term "ablation" refers to a process of removal of a substance. The first electrode material and the second electrode material can be selectively removed from the surface of the first substrate and the surface of the second substrate to create the first electrode and the second electrode, respectively. Optionally, the step of ablating is performed using laser ablation. A technical effect of performing the step of ablation using laser ablation is that the first electrode material and the second electrode material are removed without generating excessive heat and mechanical stress, thereby causing no damage to the first electrode and the second electrode so created. Furthermore, the laser ablation can be used to create precise cuts, holes, or other features in the first electrode material and the second electrode material.

Alternatively, optionally, the step of ablating is performed using etching. Herein, the term "etching" refers to removal of the given electrode material from the given substrate by means of physical etching or chemical etching. This can be used to create the given electrode with a high aspect ratio, namely to by precise selective-removal of the given electrode material from the surface of the given substrate.

Throughout the present disclosure, the term "electrically-conductive adhesive material" refers to a material having adhesive properties as well as electrical conductivity properties. Optionally, the electrically-conductive adhesive material comprises a polymer matrix that comprises conductive particles. Herein, the conductive particles provide electrical conductivity, while the polymer matrix provides adhesive properties. Advantageously, the electrically-conductive adhesive material is used to provide a uniform and reliable electrical connection of the first electrode to the other components. Examples of the electrically-conductive adhesive material may include, but are not limited to, an electrically-conductive epoxy adhesive, an electrically-conductive silicone adhesive, an electrically-conductive acrylic adhesive, an electrically-conductive polyurethane adhesive, and an isotropic conductive adhesive.

Furthermore, optionally, the driving circuit is implemented as a flexible printed circuit. Herein, the term "flexible printed circuit" refers to a type of electronic circuit that is made using flexible, thin and lightweight materials. A material for construction of the flexible printed circuit is selected in such a manner, so that the flexible printed circuit is able to withstand bending and folding. One examples of such a material is polyimide. Advantageously, the flexible printed circuit is modular and lightweight. Furthermore, a number of interconnects required to make the electrical connections are reduced, thereby improving reliability and reducing a risk of failure.

Herein, the term "driving circuit" refers to an electronic circuit that is responsible for controlling various aspects of the operation of the optical device. As an example, a voltage of the first electrode and the second electrode can be controlled, to produce a given optical power at the optical device. The driving circuit could include various electronic components, for example, such as transistors, resistors, capacitors, and/or integrated circuits. Herein, the electronic components are arranged in a specific configuration to achieve a functionality of the driving circuit, depending on a purpose of the optical device.

Moreover, optionally, the electrically-conductive adhesive material is electrically connected with the driving circuit using at least one of: an anisotropic conductive film, an isotropic conductive adhesive (ICA), an elastomeric connector comprising alternating conductive regions and insulating regions in an elastomer matrix.

Herein, the term "anisotropic conductive film" refers to a thin, flexible film which emulates an adhesive interconnect system. The anisotropic conductive film can be used to make electrical and mechanical connections from the electrically-conductive adhesive material to the flexible printed circuit. The anisotropic conductive film comprises conductive particles embedded in a polymer matrix. The conductive particles could be made of a metal-coated polymer material. The conductive particles could be arranged in a specific pattern that allows for electrical conductivity in one direction only. In this regard, the anisotropic conductive film could be conductive in one direction (i.e., towards the flexible printed circuit) and insulating in remaining directions.

Optionally, the anisotropic conductive film is in a form of a roll or a sheet, which can be easily cut to size and shape. The anisotropic conductive film is placed between the electrically-conductive adhesive material and the flexible printed circuit to be electrically connected, and a pressure is applied to bond the electrically-conductive adhesive material and the flexible printed circuit together. As a result of applying the pressure, the conductive particles in the anisotropic conductive film are compressed together, thereby making contact with both the electrically-conductive adhesive material and the flexible printed circuit. This creates a conductive pathway between them. The technical benefits of electrically connecting the electrically-conductive adhesive material with the driving circuit using an anisotropic conductive film is that risks related to electrical shorts are reduced, and variations in component height and spacing are well tolerated. Moreover, making the electrical connections can be automated with ease, thereby reducing an overall manufacturing cost of the optical device.

The term "isotropic conductive material" refers to a type of adhesive material comprising conductive particles dispersed within it, facilitating electrical conductivity in all directions. The ICA can be used to bond components, while providing electrical connections therebetween, eliminating a need for soldering. With low-temperature curing capabilities, they are suitable for heat-sensitive substrates, ensuring mechanical stability and maintaining electrical conductivity over time despite environmental stressors.

The term "elastomeric connector", also known simply as a "Zebra connector" or "Zebra strip", refers to a type of electrical connector used to establish electrical connections between two components, one of these two components being typically a flexible printed circuit (FPC) or printed circuit board (PCB). The alternating conductive regions and the insulating regions are embedded in the elastomer matrix, which could be rubber-like.

As mentioned earlier, optionally, the optical device is any of: a liquid crystal cell, a liquid crystal lens, a liquid crystal display panel, a liquid crystal on silicon (LCOS) display panel, an organic light-emitting diode display panel, an electrophoretic display panel, an electro-wetting lens, an index-matching lens, a tunable optical filter.

Optionally, when the optical device is any of: the liquid crystal cell, the liquid crystal lens, the liquid crystal display panel, the liquid crystal on silicon (LCOS) display panel, a tunable optical filter, the at least one active material comprises a liquid crystal material. In such a case, when controlling the at least one active material, an alignment of liquid crystal molecules of the liquid crystal material is controlled to adjust at least one optical property (for example, such as a refractive index, a transparency, a polarization, or similar) of the liquid crystal material in the optical device.

Optionally, when the optical device is a liquid crystal lens, a given electrode (namely, the first electrode and/or the second electrode) is driven at a given voltage that corresponds to a given optical power that is to be produced. In such a case, in order to produce the given optical power, the refractive index of the liquid crystal material is controlled by generating a potential difference between first electrode and the second electrode using the driving circuit. This allows for varying a shape of the liquid crystal lens, based on a focal length to be produced. Moreover, a transparency of at least a part of the liquid crystal lens could be controlled by controlling a density of the liquid crystal material.

In some implementations of the liquid crystal lens, when a zero potential difference is generated (namely, by applying a same voltage to both the aforesaid electrodes or by connecting both the aforesaid electrodes to an electrical ground), the optical device is in an 'OFF' mode in which the optical device has a predefined optical power (in other words, a base optical power), which may be a negative optical power, a zero optical power, or a positive optical power, depending on user's requirement. In other implementations of the liquid crystal lens, the optical device is in an 'ON' mode in which the given optical power is produced, when a given potential difference is generated between the first electrode and the second electrode depending on the given optical power that is to be produced. In this regard, the first electrode and the second electrode can be supplied with varying voltages to allow different amounts of the potential difference to be generated therebetween. It will be appreciated that when the first electrode is driven at the given voltage, the second electrode may be connected to an electrical ground.

It will be appreciated that in a case where the at least one active material comprises a liquid crystal material, manufacturing of the optical device would be easy and economical, as certain processes for existing liquid-crystal display (LCD) manufacturing could be employed for manufacturing the optical device.

Optionally, when the optical device is a liquid crystal cell, the voltage of the first electrode and the second electrode is varied to control a transparency of (namely, an amount of light passing through) the liquid crystal cell. This allows the liquid crystal cell to function as a variable optical attenuator, a polarization rotator, or similar.

Optionally, when the optical device is a liquid crystal display panel, the voltage of the first electrode and the second electrode is varied to control a polarization of the visible light passing through the liquid crystal display panel. This results into a formation of an image comprising a combination of a plurality of pixels, each pixel displaying a corresponding colour at a corresponding brightness.

Optionally, when the optical device is an LCOS display panel, one of the first substrate and the second substrate is implemented as a silicon substrate having a reflective layer. The layer of the at least one active material (namely, the liquid crystal material) controls the polarization of light that passes through it, while the reflective layer reflects the light back. The silicon substrate is used to control individual pixels. In this regard, the voltage of the first electrode and the second electrode is controlled to control the at least one active material.

Optionally, when the optical device is an organic light-emitting diode display panel, the layer of the at least one active material comprises at least one of: an organic layer, a conducting layer, an emissive layer. Herein, the organic layer is composed of organic molecules or polymers. The conducting layer could be composed of organic plastic molecules that transport holes from an anode (out of the first electrode and the second electrode). Examples of such an organic plastic molecules include, but are not limited to, polyaniline and polyethylenedioxythiophene. The emissive layer could be made of another organic plastic molecules that transport electrons from a cathode (out of the first electrode and the second electrode). An example of the another organic plastic molecule is polyfluorene. In operation, the organic light-emitting diode display panel creates and subsequently emits light at the emissive layer.

Optionally, when the optical device is an electrophoretic display panel, microcapsules are deposited on top of at least one of: the first substrate, the second substrate, wherein the microcapsules comprise charged pigment particles. In this regard, a voltage is applied to the first electrode and the second electrode to move the charged pigment particles, thereby creating a visible image.

Optionally, when the optical device is an electro-wetting lens, the at least one active material comprises an electrically-conducting liquid and an electrically-insulating liquid. In such a case, a curvature of a meniscus between the electrically-conducting liquid and the electrically-insulating liquid can be controlled with a change in a potential difference generated between the first electrode and the second electrode. Thus, a given optical power can be produced based on an amount of the potential difference that is generated between the first electrode and the second electrode.

Optionally, when the optical device is an index-matching lens, a refractive index of the at least one active material could be controlled to match a refractive index of at least one of: the first substrate, the second substrate. As a result, the optical device produces a base optical power, which may be a negative optical power, a zero optical power, or a positive optical power. The refractive index of the at least one active material could also be controlled to be different from the refractive index of the at least one of: the first substrate, the second substrate, thereby creating a relative refractive index. Such a relative refractive index allows to produce a given optical power at the index-matching lens.

Optionally, when the optical device is a tunable optical filter, the at least one active material is controlled by adjusting the voltage of the first electrode and the second electrode, to transmit a predefined wavelength of light.

Accordingly, in the aforementioned second aspect, optionally, when stacked together, the plurality of optical devices form any of: a composite liquid crystal lens, a volumetric liquid crystal display, a volumetric liquid crystal on silicon (LCOS) display, a volumetric organic light-emitting diode display, a volumetric electrophoretic display, a composite electro-wetting lens, a composite index-matching lens, a composite tunable optical filter.

When the plurality of optical devices form the composite liquid crystal lens, it means that multiple liquid crystal lenses are stacked together. When the plurality of optical devices form the volumetric liquid crystal display, it means that multiple liquid crystal display panels are stacked together. When the plurality of optical devices form the volumetric liquid crystal on silicon (LCOS) display, it means that multiple liquid crystal on silicon (LCOS) display panels are stacked together. When the plurality of optical devices form the volumetric organic light-emitting diode display, it means that multiple organic light-emitting diode display panels are stacked together. When the plurality of optical devices form the volumetric electrophoretic display, it means that multiple electrophoretic display panels are stacked together. When the plurality of optical devices form the composite electro-wetting lens, it means that multiple electro-wetting lenses are stacked together. When the plurality of optical devices form the composite index-matching lens, it means that multiple index-matching lenses are stacked together. When the plurality of optical devices form the composite tunable optical filter, it means that multiple tunable optical filters are stacked together.

Optionally, when the plurality of optical devices form a composite liquid crystal lens, the liquid crystal material in the plurality of optical devices (that are stacked together) is controlled separately to produce respective optical powers, wherein the respective optical powers produced at the plurality of optical devices are combined to produce an overall optical power. A technical benefit of stacking together a plurality of liquid crystal lenses (namely, the plurality of optical devices) is that a high optical power can be produced, based on a user's requirement.

DETAILED DESCRIPTION OF THE DRAWINGS

Referring to FIG. 1, there is illustrated a cross-sectional view of an assembly 100 of a plurality of optical devices 102A-102D, in accordance with an embodiment of the present disclosure. Each of the plurality of optical devices 102A-102D comprises a first substrate 104 on which a first electrode 106 is formed, a second substrate 108 on which a second electrode 110 is formed, and a layer 112 of at least one active material between the first substrate 104 and the second substrate 108. An electrically-conductive adhesive material 114 is deposited on a first part of the first electrode 106. Between adjacent optical devices of the assembly 100, an optically-clear adhesive 116 is filled, which enables passage of light incident on the plurality of optical devices 102A-102D.

The plurality of optical devices 102A-102D are cut through respective first parts on which the electrically-conductive adhesive material 114 is deposited in a single step, as shown with a dashed line 118. This exposes the electrically-conductive adhesive material 114 and allows for making electrical connections between respective first electrodes of the plurality of optical devices 102A-102D and a driving circuit.

Figure 2A:
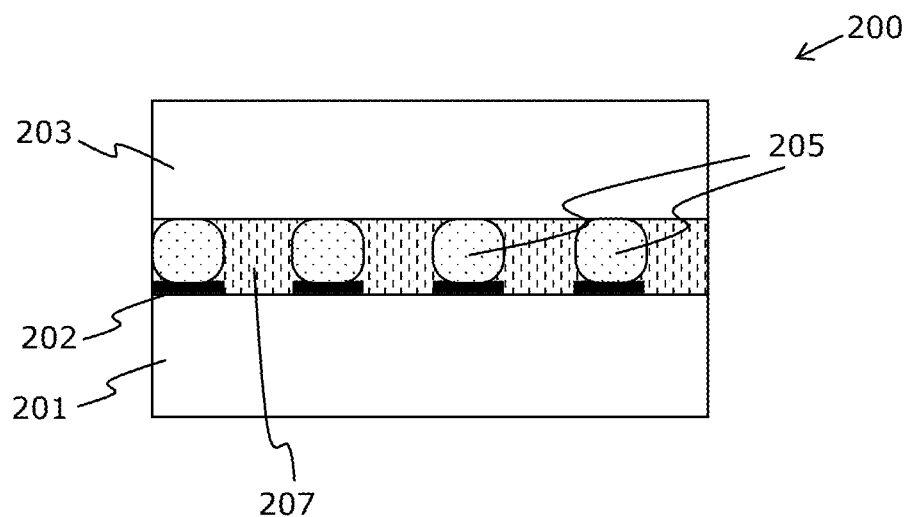
Figure 2B:
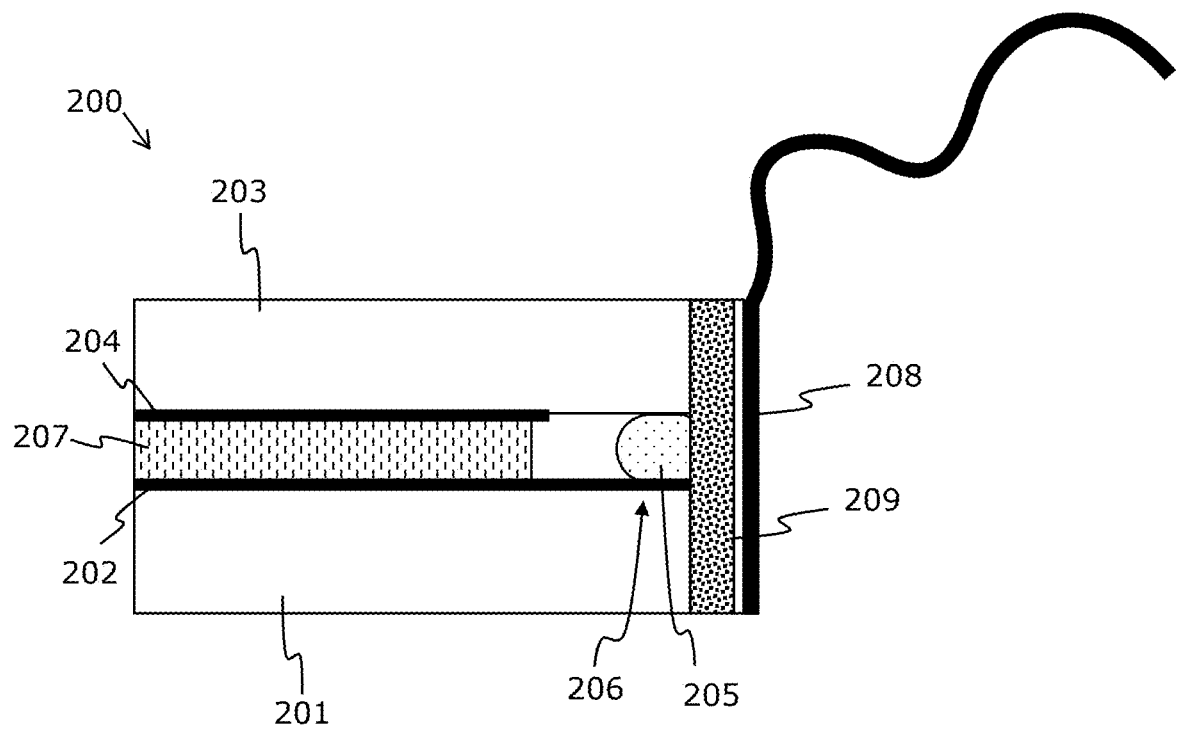
FIG. 2B illustrates a side cross-section view of the optical device, in accordance with an embodiment of the present disclosure.

In FIG. 2A, illustrated is a front cross-section view of an optical device 200, whereas in FIG. 2B, illustrated is a side cross-section view of the optical device 200, in accordance with an embodiment of the present disclosure. In FIGS. 2A and 2B, the optical device 200 comprises a first substrate 201, a first electrode 202 deposited on the first substrate 201, a second substrate 203, and a second electrode 204 deposited on the second substrate 203, wherein an electrically-conductive adhesive material 205 is deposited on a first part 206 of the first electrode 202. The optical device 200 further comprises a layer 207 of at least one active material encased between the first substrate 201 and the second substrate 203.

In FIG. 2B, the side cross-section view depicts that when the optical device 200 is cut through the first part 206 of the first electrode 202, the electrically-conductive adhesive material 205 is exposed, thereby allowing for drawing electrical connections therefrom. As shown, the electrically-conductive adhesive material 205 is electrically connected with a driving circuit 208 of the optical device 200, to provide an electrical connection between the first electrode 202 and the driving circuit 208. The electrically-conductive adhesive material 205 can be electrically connected with the driving circuit 208 using a connector 209. The connector 209 can be at least one of: an anisotropic conductive film, an ICA, an elastomeric connector comprising alternating conductive regions and insulating regions in an elastomer matrix.

FIGS. 1, 2A and 2B, are merely examples, which should not unduly limit the scope of the claims herein. The person skilled in the art will recognize many variations, alternatives, and modifications of embodiments of the present disclosure.

Figure 3:
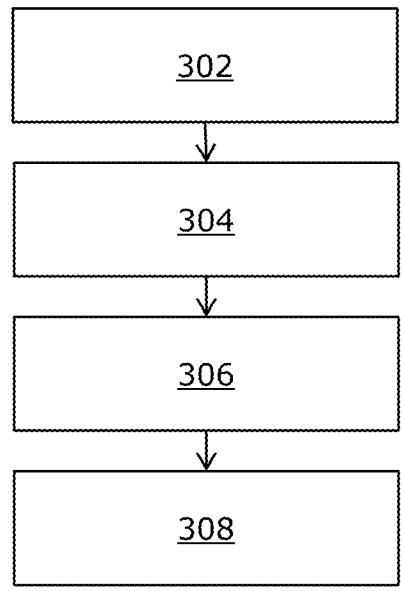
FIG. 3. illustrates steps of a method for manufacturing an optical device, in accordance with an embodiment of the present disclosure.

Referring to FIG. 3, illustrated are steps of a method for manufacturing an optical device, in accordance with an embodiment of the present disclosure. At step 302, an electrically-conductive adhesive material is deposited on a first part of a first electrode, the first electrode is deposited on a first substrate of the optical device. At step 304, a layer of at least one active material between the first substrate and a second substrate of the optical device is formed, wherein the first electrode is disposed between the first substrate and said layer of the at least one active material, and a second electrode is disposed between the second substrate and said layer of the at least one active material, the second electrode is deposited on the second substrate. At step 306, the optical device is cut through the first part of the first electrode, thereby the electrically-conductive adhesive material is exposed which is deposited on the first part of the first electrode. At step 308, a driving circuit of the optical device is electrically connected with the electrically-conductive adhesive material deposited on the first part of the first electrode, to provide an electrical connection between the driving circuit and the first electrode.

The aforementioned steps are only illustrative and other alternatives can also be provided where one or more steps are added, one or more steps are removed, or one or more steps are provided in a different sequence without departing from the scope of the claims herein.

Figure 4:
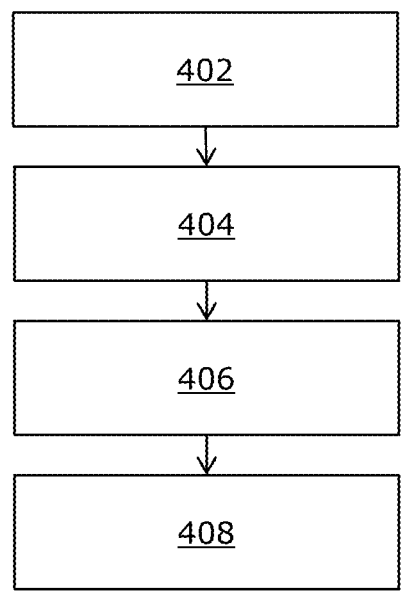
FIG. 4. illustrates steps of a method for assembling a plurality of optical devices, in accordance with an embodiment of the present disclosure.

Referring to FIG. 4, illustrated are steps of a method for assembling a plurality of optical devices, in accordance with an embodiment of the present disclosure. At step 402 a plurality of optical devices are manufactured, wherein each of the plurality of optical devices is manufactured according to method illustrated in FIG. 3 herein. At step 404, the plurality of optical devices are stacked together, whilst aligning respective first parts of first electrodes of the plurality of optical devices together. At step 406, the plurality of optical devices are cut through the respective first parts of the first electrodes of the plurality of optical devices. At step 408, a driving circuit is electrically connected with an electrically-conductive adhesive material deposited on the respective first parts, to provide an electrical connection between the driving circuit and respective first electrodes.

The aforementioned steps are only illustrative and other alternatives can also be provided where one or more steps are added, one or more steps are removed, or one or more steps are provided in a different sequence without departing from the scope of the claims herein.

What is claimed is:

1. A method for manufacturing an optical device, the method comprising:
    depositing an electrically-conductive adhesive material on a first part of a first electrode, the first electrode being deposited on a first substrate of the optical device;
    forming a layer of at least one active material between the first substrate and a second substrate of the optical device, wherein the first electrode is disposed between the first substrate and said layer of the at least one active material, and a second electrode is disposed between the second substrate and said layer of the at least one active material, the second electrode being deposited on the second substrate;
    cutting the optical device through the first part of the first electrode, thereby exposing the electrically-conductive adhesive material deposited on the first part of the first electrode; and
    electrically connecting a driving circuit of the optical device with the electrically-conductive adhesive material exposed by cutting the optical device through the first part of the first electrode, to provide an electrical connection between the driving circuit and the first electrode.

2. The method of claim 1, further comprising:
aligning the first substrate and the second substrate together, prior to or during the step of forming the layer of the at least one active material, wherein the first part of the first electrode does not overlap with the second part of the second electrode when the first substrate and the second substrate are aligned together.

3. The method of claim 1, wherein the electrically-conductive adhesive material is deposited using any one of: dispensing, stencil printing.

4. The method of claim 1, wherein the electrically-conductive adhesive material is deposited in a form of at least one of: one or more dots, one or more lines.

5. The method of claim 1, wherein a width of the electrically-conductive adhesive material deposited on the first part and optionally the second part is same as a width of a gap between the first substrate and the second substrate in the optical device.

6. The method of claim 1, wherein the driving circuit is implemented as a flexible printed circuit.

7. The method of claim 1, wherein the electrically-conductive adhesive material is electrically connected with the driving circuit using at least one of: an anisotropic conductive film, an isotropic conductive adhesive, an elastomeric connector comprising alternating conductive regions and insulating regions in an elastomer matrix.

8. The method of claim 1, wherein the optical device is any of: a liquid crystal cell, a liquid crystal lens, a liquid crystal display panel, a liquid crystal on silicon (LCOS) display panel, an organic light-emitting diode display panel, an electrophoretic display panel, an electro-wetting lens, an index-matching lens, a tunable optical filter.

9. A method for assembling a plurality of optical devices, the method comprising:
manufacturing a plurality of optical devices, wherein each of the plurality of optical devices is manufactured using a method of claim 1;
stacking the plurality of optical devices together, whilst aligning respective first parts of first electrodes of the plurality of optical devices together;
cutting the plurality of optical devices through the respective first parts of the first electrodes of the plurality of optical devices; and
electrically connecting a driving circuit with an electrically-conductive adhesive material deposited on the respective first parts, to provide an electrical connection between the driving circuit and respective first electrodes.

10. The method of claim 9,
wherein the respective second parts are also aligned together during stacking.

11. The method of claim 9, wherein the electrically-conductive adhesive material is deposited by using any one of: dispensing, stencil printing.

12. The method of claim 9, wherein the electrically-conductive adhesive material is deposited in a form of at least one of: one or more dots, one or more lines.

13. The method of claim 9, wherein the driving circuit is implemented as a flexible printed circuit.

14. The method of claim 9, wherein the electrically-conductive adhesive material is electrically connected with the driving circuit using at least one of: an anisotropic conductive film, an isotropic conductive adhesive, an elastomeric connector comprising alternating conductive regions and insulating regions in an elastomer matrix.

15. The method of claim 9, wherein when stacked together, the plurality of optical devices form any of: a composite liquid crystal lens, a volumetric liquid crystal display, a volumetric liquid crystal on silicon (LCOS) display, a volumetric organic light-emitting diode display, a volumetric electrophoretic display, a composite electro-wetting lens, a composite index-matching lens, a composite tunable optical filter.

* * * * *